US010574624B2

(12) United States Patent
Newton et al.

(10) Patent No.: US 10,574,624 B2
(45) Date of Patent: Feb. 25, 2020

(54) STAGED DEPLOYMENT OF RENDEZVOUS TABLES FOR SELECTING A CONTENT DELIVERY NETWORK (CDN)

(71) Applicant: Level 3 Communications, LLC, Broomfield, CO (US)

(72) Inventors: Christopher Newton, Westlake Village, CA (US); Hong Zhu, Moorpark, CA (US)

(73) Assignee: Level 3 Communications, LLC, Broomfield, CO (US)

(*) Notice: Subject to any disclaimer, the term of this patent is extended or adjusted under 35 U.S.C. 154(b) by 117 days.

(21) Appl. No.: 15/727,892

(22) Filed: Oct. 9, 2017

(65) Prior Publication Data

US 2019/0109812 A1 Apr. 11, 2019

(51) Int. Cl.
*G06F 13/00* (2006.01)
*H04L 29/12* (2006.01)
*H04L 29/08* (2006.01)

(52) U.S. Cl.
CPC ...... *H04L 61/1535* (2013.01); *H04L 67/1023* (2013.01); *H04L 61/1511* (2013.01)

(58) Field of Classification Search
CPC ........... G06F 13/00; H04B 3/23; H04B 3/232; H04B 3/238; H04B 3/237; H04B 7/212; H04L 12/28; H04L 12/56; H04L 12/5601; H04L 29/06; H04L 29/0653; H04L 29/08072; H04L 29/12009; H04L 29/12066; H04L 45/00; H04L 45/02; H04L 45/04; H04L 45/21; H04L 45/54; H04L 45/64; H04L 47/10; H04L 49/351; H04L 49/3009; H04L 61/1511; H04L 29/08; H04L 29/12; H04L 61/1535; H04L 67/1023; H04M 9/082; H04Q 11/0478
USPC ............. 370/289, 389, 395.31; 709/242, 245
See application file for complete search history.

(56) References Cited

U.S. PATENT DOCUMENTS

| 6,185,598 | B1  |   | 2/2001  | Farber et al. |              |
|-----------|-----|---|---------|---------------|--------------|
| 8,060,613 | B2  | * | 11/2011 | Farber        | G06F 9/505   |
|           |     |   |         |               | 709/226      |
| 8,925,930 | B2  | * | 1/2015  | Komine        | B23B 31/20   |
|           |     |   |         |               | 279/42       |
| 2009/0052445 | A1 | * | 2/2009 | Folkes        | H04L 45/02   |
|           |     |   |         |               | 370/389      |

(Continued)

OTHER PUBLICATIONS

International Search Report and Written Opinion of the International Searching Authority, dated Aug. 31, 2018, Int'l Appl. No. PCT/US18/038461, Intl Filing Date Jun. 20, 2018; 7 pgs.

*Primary Examiner* — Robert B Harrell (57) ABSTRACT

A computer-implemented method in a content delivery network (CDN), wherein the CDN delivers content on behalf of at least one content provider. The CDN includes a rendezvous system that selects CDN servers for clients. In response to a request by a rendezvous mechanism in the rendezvous system, a first given function is evaluated. Based on the outcome of the evaluating, the rendezvous mechanism uses either a first table or a second table. The first table was generated by a first table generation mechanism for use by said rendezvous mechanism to select CDN servers for clients, and the second table was generated by a second table generation mechanism for use by the rendezvous mechanism to select CDN servers for clients.

15 Claims, 4 Drawing Sheets

(56) References Cited

U.S. PATENT DOCUMENTS

2011/0219120 A1 9/2011 Farber et al.
2014/0173067 A1 6/2014 Newton et al.
2014/0372589 A1 12/2014 Newton et al.

* cited by examiner

STAGED DEPLOYMENT OF RENDEZVOUS TABLES FOR SELECTING A CONTENT DELIVERY NETWORK (CDN)

BACKGROUND OF THE INVENTION

Copyright Statement

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to content delivery and content delivery networks. More specifically, this invention relates to staged deployment of rendezvous tables in content delivery networks (CDNs).

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Glossary

As used herein, unless used otherwise, the following terms or abbreviations have the following meanings:

CD means content delivery;
CDN means content delivery network;
DNS means domain name system;
URI means Uniform Resource Identifier; and
URL means Uniform Resource Locator.

A "mechanism" refers to any device(s), process(es), routine(s), service(s), module(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

Description

A content delivery network (CDN) distributes content (e.g., resources) efficiently to clients on behalf of one or more content providers, preferably via a public Internet. Content providers provide their content (e.g., resources) via origin sources (origin servers or origins). A CDN can also provide an over-the-top transport mechanism for efficiently sending content in the reverse direction—from a client to an origin server. Both end-users (clients) and content providers benefit from using a CDN. Using a CDN, a content provider is able to take pressure off (and thereby reduce the load on) its own servers (e.g., its origin servers). Clients benefit by being able to obtain content with fewer delays.

Figure 1:
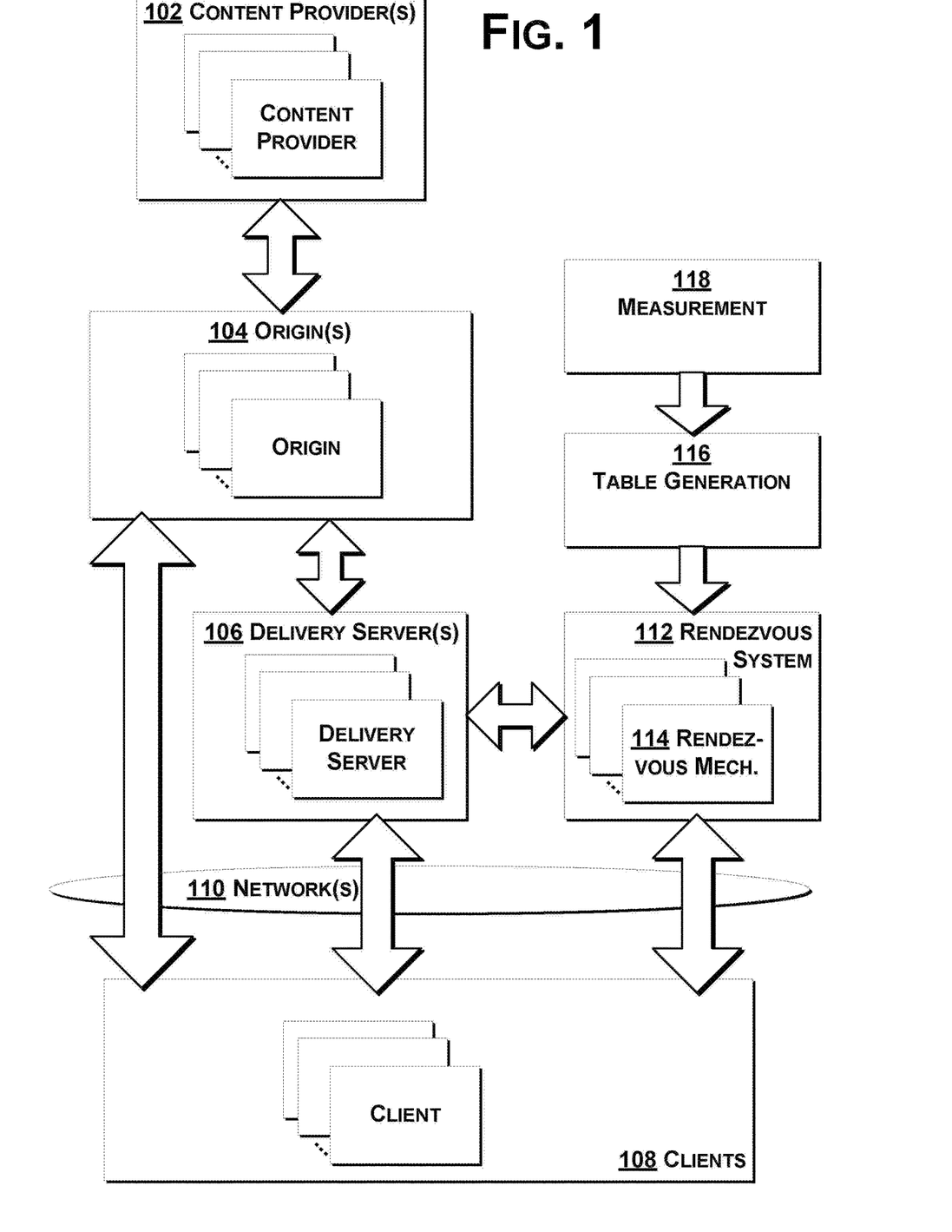
FIG. 1 depicts aspects of a content delivery network (CDN) according to exemplary embodiments hereof.

FIG. 1 shows aspects of an exemplary CDN in which one or more content providers 102 provide content via one or more origin sources 104 and delivery services (servers) 106 to clients 108 via one or more networks 110. The delivery services (servers) 106 may form a delivery network from which clients 108 may obtain content. The delivery services 106 may be logically and/or physically organized hierarchically and may include edge caches. The delivery services 106 may be logically and/or physically organized as clusters and super-clusters, as described below.

As should be appreciated, components of a CDN (e.g., delivery servers or the like) may use the CDN to deliver content to other CDN components. Thus a CDN component may itself be a client of the CDN. For example, the CDN may use its own infrastructure to deliver CDN content (e.g., CDN control and configuration information) to CDN components.

Client requests (e.g., for content) may be associated with delivery server(s) 106 by a rendezvous system 112 comprising rendezvous mechanism(s) 114, possibly in the form of one or more rendezvous networks. The rendezvous mechanism(s) 114 may be implemented, at least in part, using or as part of a DNS system, and the association of a particular client request (e.g., for content) with one or more delivery servers may be done as part of DNS processing associated with that particular client request (e.g., of a domain name associated with the particular client request).

Typically, multiple delivery servers 106 in the CDN can process or handle any particular client request for content (e.g., for one or more resources). Preferably the rendezvous system 112 associates a particular client request with one or more "best" or "optimal" (or "least worst") delivery servers 106 to deal with that particular request. The "best" or "optimal" delivery server(s) 106 may be one(s) that is (are) close to the client (by some measure of network cost) and that is (are) not overloaded. Preferably the chosen delivery server(s) 106 (i.e., the delivery server(s) chosen by the rendezvous system 112 for a client request) can deliver the requested content to the client or can direct the client, somehow and in some manner, to somewhere where the client can try to obtain the requested content. A chosen delivery server 106 need not have the requested content at the time the request is made, even if that chosen delivery server 106 eventually serves the requested content to the requesting client.

When a client 108 makes a request for content, the client may be referred to as the requesting client, and the delivery server 106 that the rendezvous system 112 associates with that client request (and that the client first contacts to make the request) may be referred to as the "contact" server or just the contact.

Exemplary CDNs are described in U.S. Pat. Nos. 8,060,613 and 8,925,930, the entire contents of both of which have been fully incorporated herein by reference for all purposes.

As noted above, the rendezvous mechanism(s) 114 may be implemented, at least in part, using or as part of a DNS system. Typically the rendezvous mechanism(s) 114 comprise a network of DNS name servers that are used to associate client requests with delivery servers.

In order to make server selections and other decisions, the rendezvous system 112 uses one or more tables generated, e.g., by table generation mechanism(s) 116. The table generation mechanism(s) 116 build tables representative of, e.g., network load and topography, as well as load on the delivery servers 106. The table generation mechanism(s) 116 may use measurements obtained by measurement mechanism(s) 118 as well as information provided by various network components. There may be multiple table generation mechanism(s), e.g., for redundancy.

Exemplary tables and table generation processes are described in U.S. Pat. No. 6,185,598, "Optimized network resource location," the entire contents of which are hereby fully incorporated herein by reference for all purposes. U.S. Pat. No. 6,185,598 describes, e.g., the three pre-computed tables, namely the Group Reduction Table, the Link Cost Table, and the Load Table that may be used for server selection.

The tables generated by the table generation mechanism(s) 116 may represent information about at least some of the Internet. As such, these tables may change often (e.g., as link costs and server loads change). Further, given their size (or coverage), it is very difficult to test the validity or integrity of the tables before they are distributed. As with all testing, there are cases that may be missed. As should be appreciated, a consequence of a bad table, i.e., of bad input to the rendezvous system 112 is that a client request may be sent to a wrong or inappropriate location. Thus, for example, testing may not catch an anomaly that causes a client request to go to a server in Bogota instead of Los Angeles, and such a problem may only come to light when lots of client requests are suddenly going to Bogota (instead of, say, Frankfurt).

Updates to the table generation mechanism(s) (e.g., to correct bugs or errors, or to incorporate improvements) should therefore be judiciously applied.

Figure 2:
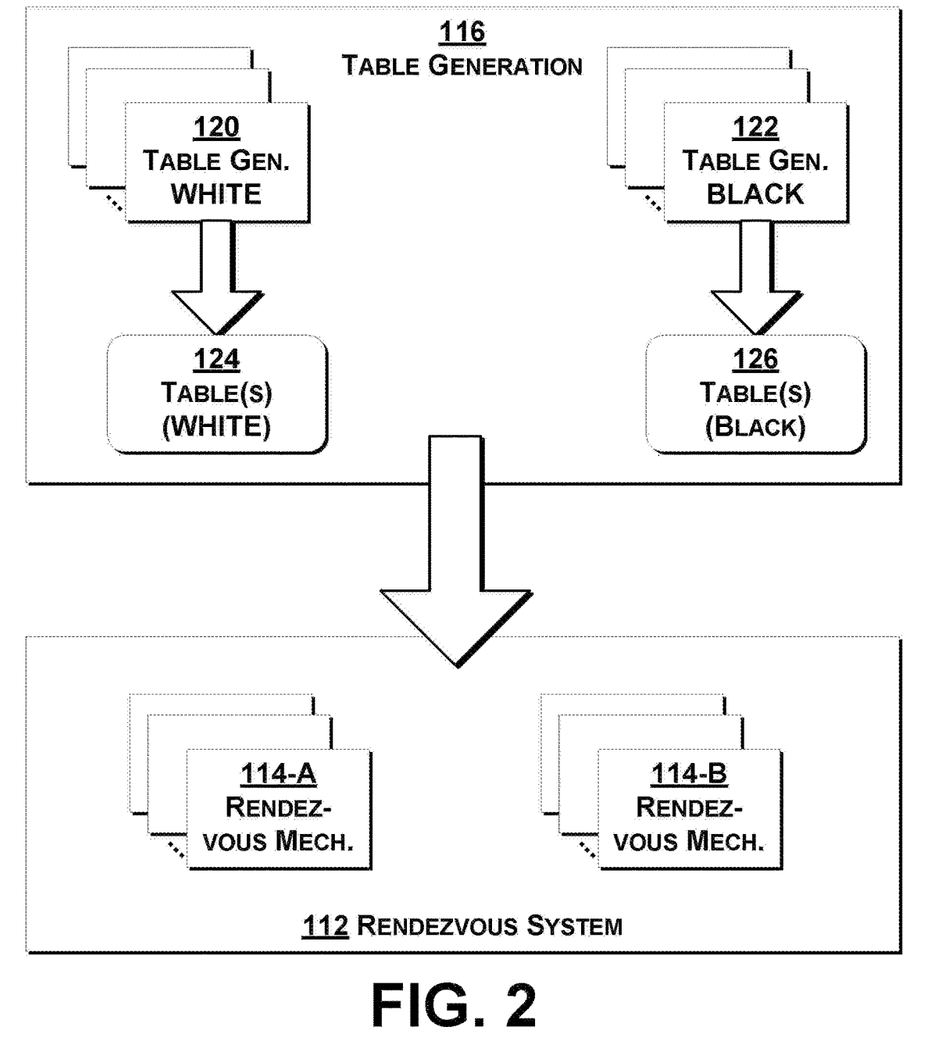
FIG. 2-3 depict aspects of exemplary embodiments hereof.

With reference now to FIG. 2, when an updated version is to be applied, the table generation mechanism(s) 116 are split into two, namely the old and tested version 120 of the table generation mechanism(s), and the new/updated version 122 of the table generation mechanism(s). For the sake of this description, the old version is referred to as the "white" version, and the new version is referred to as the "black" version.

Figure 3:
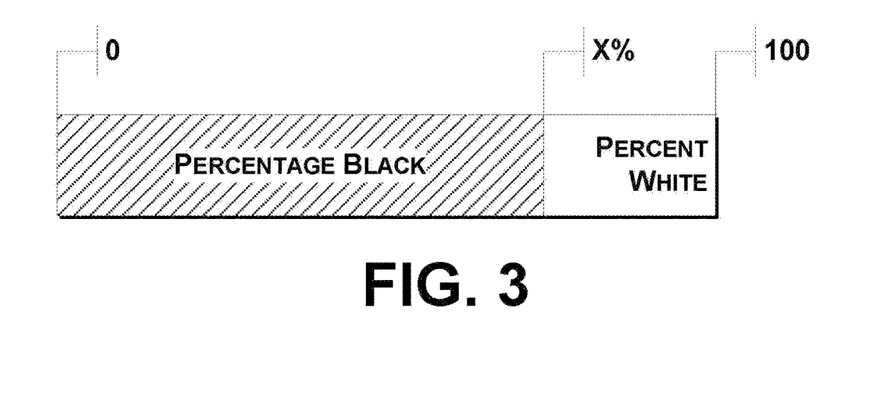

At the start of a transition (from old to new table generation mechanism(s)), the rendezvous system 112 is using only the white tables 124 produced by the white (or old) table generation mechanism(s) 120. Rather than have an atomic (binary) switch from the white tables 124 to the black tables 126, the rendezvous mechanism(s) 112 may gradually transition according to a function (e.g., as shown in FIG. 3). The function preferably represents a desired ratio or percentage of black to white tables usage. For some preferred embodiments hereof, the function is used to determine whether a particular rendezvous mechanism 114 should use a Black table or a White Table. For example, as shown in FIG. 2, the current state of the function is X % Black (and therefore 100−X % White), meaning that X % of the rendezvous mechanism(s) 114 should be using the Black tables.

The function preferably changes over time to be 100% Black. The change may be linear or exponential, and the time period may be any time period, e.g., 10 hours, one day, a week, etc. E.g., function that changes linearly over 10 hours may increase 10% per hour. As another example, a function may start at 5% Black, increase to 10% Black after 6 hours, to 50% Black after 12 hours, and to 100% Black after 18 hours.

In presently preferred exemplary implementation, both sets of tables (Black and White) are made available to the rendezvous system, and the decision of which set of tables to be used may be made on a per-rendezvous request basis. Thus the decision of which set of tables to be used may be made with a fine-scale granularity and allows the system to force the use of one or other set of tables by encoding a flag into either the request or a policy associated with the request).

At DNS resolution time (when a rendezvous is being determined), a determination is made as to which set of tables to use. That determining may be driven, e.g., by a percentage switch (FIG. 3), or forced to one set of tables or the other by a flag on the request, or could use a different percentage as specified in a configuration policy for the name being resolved.

The chosen set of tables are then used when performing the name resolution, so that selection of the delivery server(s) is driven from one or other set of tables.

In addition, certain delivery server(s), preferably in each super-cluster and in multiple geographic/network locations within each, may be dedicated to either the white or black network. These servers may be used as markers and can be used to observe the behavior of new tables, even at relatively low traffic levels. For example, if the Black tables are new, and if the only black marker clusters getting any traffic are in Bogota then that may indicate that the new black tables are bad and are directing all traffic there It should be understood that transition described herein is used when the table generation mechanism(s) are changed, and a routine change in the tables generated by the table generation mechanism(s) 116 need not trigger or require a gradual transition, as described herein. In other words, routine table updates based on new measurements, etc., do not require or use the gradual update functions described herein.

Figure 4:
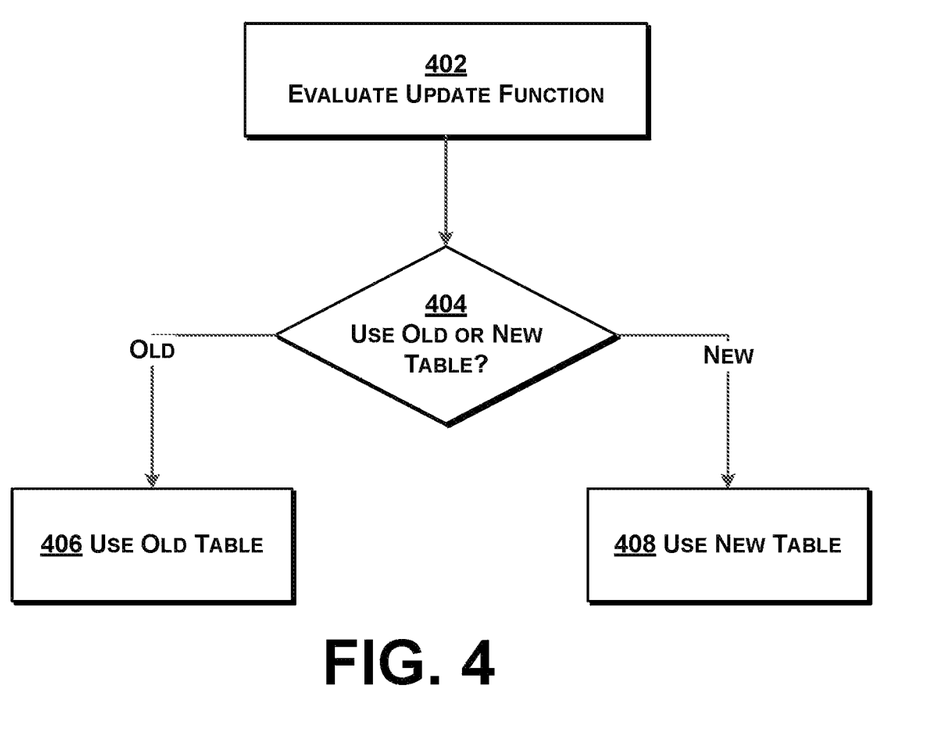
FIG. 4 is a flowchart depicting aspects of exemplary embodiments hereof.

With reference to the flowchart in FIG. 4, the process of selecting the rendezvous tables for a particular request at rendezvous mechanism 114 involves first (at 402) evaluating the update function. Then, based on the outcome of the function evaluation (in 402), determine whether this rendezvous mechanism 114 uses new (Black) or old (White) table(s). If this rendezvous mechanism 114 is to use new (Black) table(s) for this request (as determined at 404), then new (Black) tables are used. Otherwise, if this rendezvous mechanism 114 is to use old (White) table(s) for this particular request (as determined at 404), then old (White) tables are used (at 408).

As should be appreciated, the old (White) and new (Black) table generation mechanism(s) 120, 122 will run in parallel, so that the old mechanisms 120 can be switched back in if any problems are found with the new (Black) tables. As should be appreciated, even after the rendezvous system 112 is running entirely on "new" (Black) tables, the old table generation mechanism(s) may be kept running so that they can provide a warm start in case of a failure discovered in the Black tables (e.g., requests are being wrongly sent to Bogota).

When the new (Black) system is considered stable, and when a new table generation system is to be introduced, the old "white" system can be removed and the black system will become the white system for the purposes of the next upgrade.

Recall that the CDN delivers content on behalf of subscribers to the CDN. Content from a subscriber may be referred to as a property, and a particular subscriber may have more than one property. In some cases, a property may be considered to be the content or resources associated with a particular hostname or domain name. The delivery requirements (e.g., with respect to time) for certain subscribers and their properties may be more (or less) constrained. For example, some subscribers may want some of their content (properties) delivered by the CDN in a most efficient manner (time wise), whereas other subscribers may use the CDN more as a distribution mechanism, with less concern for timeliness. For the former subscribers/properties, problems with the tables may translate to problems with the rendezvous system 112 for their clients, and may cause delivery slowdowns or delays. On the other hand, for the latter subscribers/properties, delivery slowdowns or delays (on the order of seconds or even minutes) may not matter.

Accordingly, in some embodiments hereof, the rendezvous mechanisms 114 of the rendezvous system 112 are split into two or more groups (e.g., rendezvous mechanism(s) 114-A and rendezvous mechanism(s) 114-B in FIG. 2). The rendezvous mechanism(s) in one group (e.g., group 114-A) may transition from the old to the new tables (i.e., from White tables 124 to Black tables 126) using the function (e.g., as shown in FIG. 3), whereas the rendezvous mechanism(s) in the other group (group 114-B) may transition at a slower rate using a different function. Alternatively, the rendezvous mechanism(s) in the second group (114-B) may not transition at all until all mechanisms in the first group (114-A) have transitioned to the new (Black) tables 124. Thus, in effect, the second group (114-B) transitions according to a second function that depends on the first function (e.g., on the completion of the first function).

Although described with two groups of rendezvous mechanisms (114-A, 114-B), it should be understood that more than two groups of rendezvous mechanisms may be used, each with a different transition function. As above, the transition functions for the various groups may interdepend. For example, there may be three groups, where the first group transitions gradually over a period of a week (using a linear function), the second group transitions less gradually over a period of two days (using an exponential function), and the third group starts to transition after the second group has fully transitioned, and then transitions over a period of a week.

Computing

The services, mechanisms, operations and acts shown and described above are implemented, at least in part, by software running on one or more computers of a CDN.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 5:
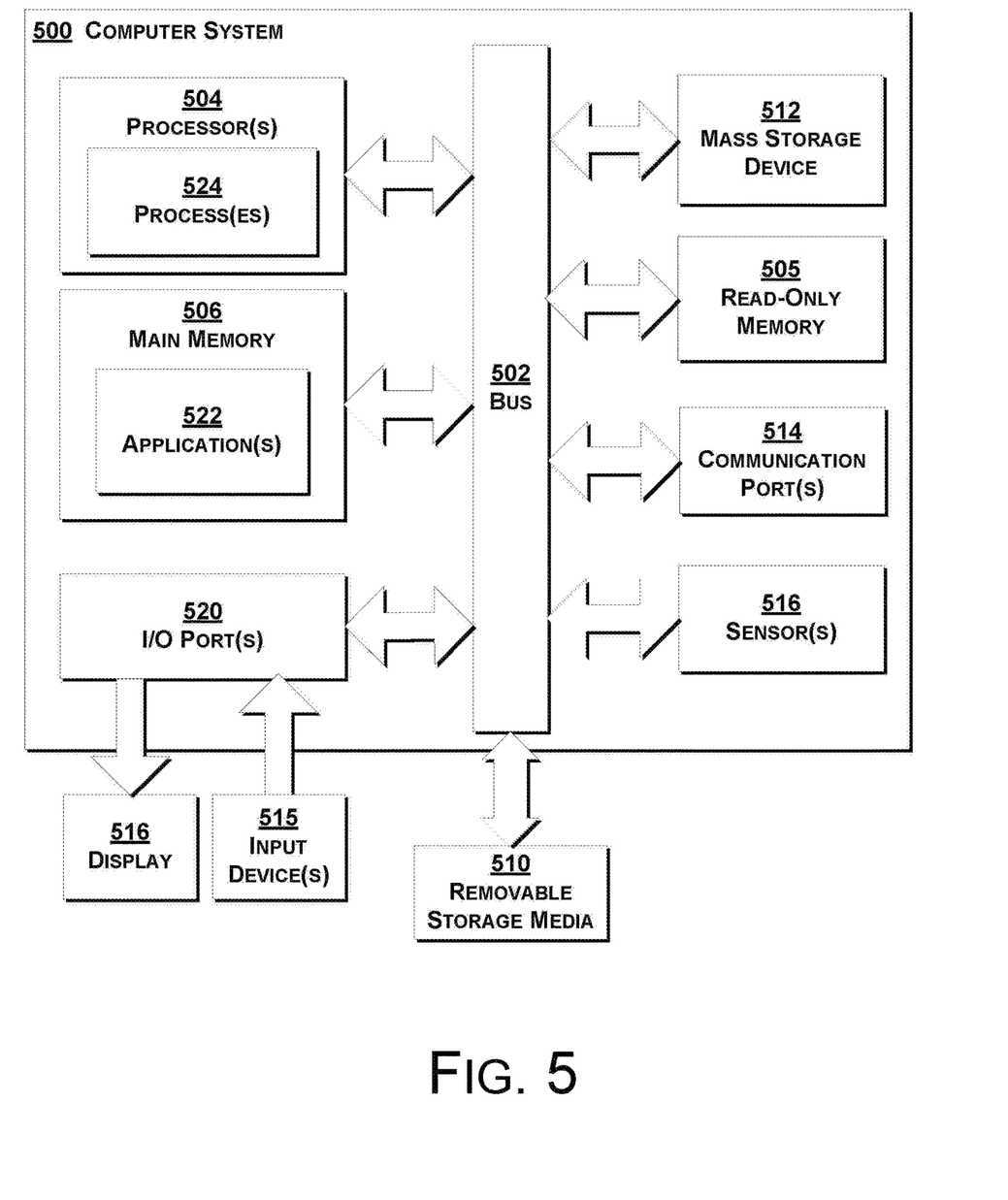
FIG. 5 depicts aspects of computing according to exemplary embodiments hereof.

FIG. 5 is a schematic diagram of a computer system 500 upon which embodiments of the present disclosure may be implemented and carried out.

According to the present example, the computer system 500 includes a bus 502 (i.e., interconnect), one or more processors 504, a main memory 506, read-only memory 508, removable storage media 510, mass storage 512, and one or more communications ports 514. Communication port 514 may be connected to one or more networks by way of which the computer system 500 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 504 can be any known processor, such as, but not limited to, an Intel® Itanium® or Itanium 2® processor(s), AMD® Opteron® or Athlon MP® processor(s), or Motorola® lines of processors, and the like. Communications port(s) 514 can be any of an RS-232 port for use with a modem based dial-up connection, a 10/100 Ethernet port, a Gigabit port using copper or fiber, or a USB port, and the like. Communications port(s) 514 may be chosen depending on a network such as a Local Area Network (LAN), a Wide Area Network (WAN), a CDN, or any network to which the computer system 500 connects. The computer system 500 may be in communication with peripheral devices (e.g., display screen 516, input device(s) 518) via Input/Output (I/O) port 520.

Main memory 506 can be Random Access Memory (RAM), or any other dynamic storage device(s) commonly known in the art. Read-only memory 508 can be any static storage device(s) such as Programmable Read-Only Memory (PROM) chips for storing static information such as instructions for processor 504. Mass storage 512 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 502 communicatively couples processor(s) 504 with the other memory, storage, and communications blocks. Bus 502 can be a PCI/PCI-X, SCSI, a Universal Serial Bus (USB) based system bus (or other) depending on the storage devices used, and the like. Removable storage media 510 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 506 is encoded with application(s) 522 that supports the functionality discussed herein (the application 522 may be an application that provides some or all of the functionality of the CD services described herein, including the client application and the optimization support mechanism 112). Application(s) 522 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 504 accesses main memory 506 via the use of bus 502 in order to launch, run, execute, interpret or otherwise perform the logic instructions of the application(s) 522. Execution of application(s) 522 produces processing functionality of the service related to the application(s). In other words, the process(es) 524 represent one or more portions of the application(s) 522 performing within or upon the processor(s) 504 in the computer system 500.

It should be noted that, in addition to the process(es) 524 that carries (carry) out operations as discussed herein, other embodiments herein include the application 522 itself (i.e., the un-executed or non-performing logic instructions and/or data). The application 522 may be stored on a computer readable medium (e.g., a repository) such as a disk or in an optical medium. According to other embodiments, the application 522 can also be stored in a memory type system such as in firmware, read only memory (ROM), or, as in this example, as executable code within the main memory 506 (e.g., within Random Access Memory or RAM). For example, application 522 may also be stored in removable storage media 510, read-only memory 508 and/or mass storage device 512.

Those skilled in the art will understand that the computer system 500 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some services" means "one or more services", and includes the case of one service.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of CDN services" may include one or more CDN services.

It should be appreciated that the words "first" and "second" in the description and claims are used to distinguish or identify, and not to show a serial or numerical limitation.

Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A computer-implemented method in a content delivery network (CDN), wherein said CDN delivers content on behalf of at least one content provider, and wherein the CDN includes a rendezvous system that selects CDN servers for clients, the method comprising:
in response to a request by a rendezvous mechanism in said rendezvous system, evaluating a first given function;
splitting a table generation mechanism into a first table generation mechanism and a second table generation mechanism; and
based on the outcome of said evaluating, said rendezvous mechanism using either a first table or a second table, wherein said first given function is indicative of a transition rate from using said first table to using said second table, wherein (i) said first table was generated by said first table generation mechanism for use by said rendezvous mechanism to select CDN servers for clients, and wherein (ii) said second table was generated by said second table generation mechanism for use by said rendezvous mechanism to select CDN servers for clients.

2. The method of claim 1 wherein said first given function evaluates to either a first value or a second value, and wherein said first table is used when said first given function evaluates to said first value, and said second table is used when said first given function evaluates to said second value.

3. The method of claim 2 wherein said first given function initially evaluates to said first value more than to said second value based on the transition rate, and wherein said first given function evaluates increasingly to said second value over time based on the transition rate.

4. The method of claim 3 wherein said first given function evaluates to said second value linearly over time.

5. The method of claim 3 wherein said first given function evaluates to said second value exponentially over time.

6. The method of claim 3 wherein, after a certain time, said first given function evaluates only to said second value.

7. The method of claim 6 wherein said first table continues to be produced after said certain time.

8. The method of claim 2, wherein said rendezvous system comprises a plurality of rendezvous mechanisms, and wherein said plurality of rendezvous mechanisms are divided into two distinct groups consisting of a first group of rendezvous mechanisms and a second group of rendezvous mechanisms, and wherein, until a certain condition is met, the first given function evaluates to the first value for rendezvous mechanisms in the first group, and wherein the first given function evaluates to either the first value or the second value for rendezvous mechanisms in the second group.

9. The method of claim 8, wherein the certain condition is considered to be met when a majority of rendezvous mechanisms in said second group have been given the second table.

10. The method of claim 9, wherein the certain condition is considered to be met when all of the rendezvous mechanisms in said second group have been given the second table.

11. The method of claim 8 wherein, after the certain condition is met, the first given function evaluates to either the first value or the second value for rendezvous mechanisms in the first group.

12. The method of claim 2 wherein said first given function comprises a selection based on a value set by an operator.

13. The method of claim 2 wherein said first given function is based on an element of the request.

14. The method of claim 2 wherein a selection is policy specified in a configuration of a name being resolved.

15. An article of manufacture comprising a non-transitory computer-readable medium having program instructions stored thereon, the program instructions, operable on a computer system in a content delivery network (CDN) and, when executed by a processor in said CDN, cause said processor to:
in response to a request by a rendezvous mechanism in a rendezvous system of the CDN, evaluate a first given function;
splitting a table generation mechanism into a first table generation mechanism and a second table generation mechanism; and
based on the outcome of said evaluating, said rendezvous mechanism use either a first table or a second table, wherein said first given function is indicative of a transition rate from using said first table to using said second table, wherein (i) said first table was generated by said first table generation mechanism for use by said rendezvous mechanism to select CDN servers for clients, and wherein (ii) said second table was generated by said second table generation mechanism for use by said rendezvous mechanism to select CDN servers for clients.

* * * * *